Sept. 7, 1943.   D. M. ANDERSON   2,328,598
VACUUM BREAKING VALVE
Filed Jan. 17, 1941

INVENTOR
DWIGHT M. ANDERSON
BY
Hyde and Meyer
ATTORNEYS

Patented Sept. 7, 1943

2,328,598

UNITED STATES PATENT OFFICE 2,328,598

VACUUM BREAKING VALVE

Dwight M. Anderson, Cleveland Heights, Ohio

Application January 17, 1941, Serial No. 374,890

1 Claim. (Cl. 137—69)

This invention relates to improvements in vacuum breaking valves such as are installed in plumbing systems to prevent contamination of water supply by reason of creation of a vacuum in the supply lines due to total or partial failure of the pressure.

An object of the present invention is to provide a vacuum breaking valve of improved type simple in construction and therefore cheap to manufacture and at the same time one which is not likely to get out of order.

Special features of my invention involve the construction and arrangement of the various parts to carry out the above named functions as will more clearly appear from the accompanying specification and drawing and the essential features thereof will be set forth in the attached claim.

Figure 1:
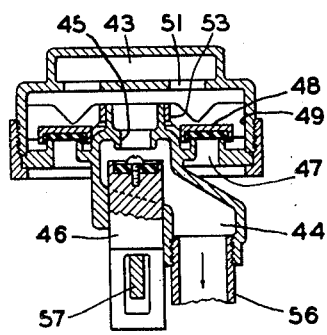
Figure 2:
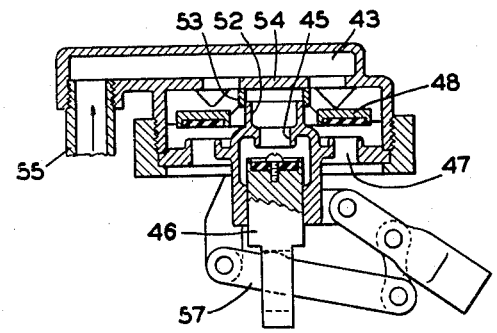
Figure 3:
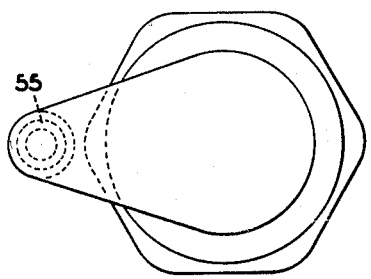
Figure 4:
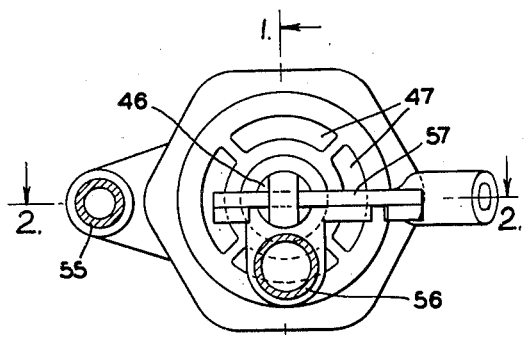
Figure 5:
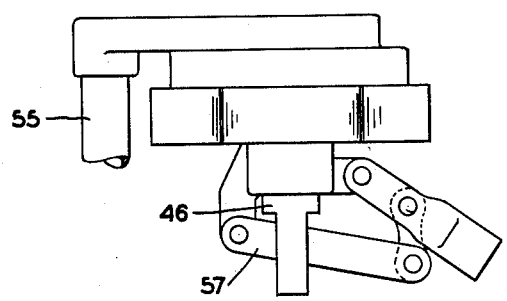

The drawing shows a ball cock embodying my invention, Figs. 1 and 2 being central sectional views taken along similarly numbered lines respectively in Fig. 4 and showing the vent valve in different positions, Fig. 3 being a top plan view, Fig. 4 being a bottom view, and Fig. 5 being a side elevational view of the same.

Those familiar with this problem recognize the danger of contamination of the water in fresh water supply mains upon failure of pressure in those mains which causes the water to recede, creating a vacuum which supplies sufficient suction to draw contaminated water back into the supply mains from wash basins, closet bowls and any place where the suction in the supply lines may draw contaminated water back into those mains. For this reason it is desirable, and in certain States compulsory, to provide in the plumbing system a valve which will break the vacuum or at least prevent the entrance of contaminated water into evacuated lines upon the failure of pressure in the supply mains. This invention is directed to that end and inasmuch as the problem is most commonly found in connection with ball cock installations most of the embodiments here disclosed deal with that type of valve. It will be understood, however, that the principles and structures here disclosed need not be embodied in any specific type of valve in order to carry out their purpose.

In Figs. 1 to 5 I have shown a form of ball cock embodying my invention. Here the water inlet passageway is indicated at 43 and the outlet passageway at 44 with the centrally located valved opening 45 coacting with the control valve 46 for controlling the flow of liquid through the body. An annularly arranged vent opening at 47 communicates between the atmosphere and the inlet passageway. This is closed by a valve 48 which has ribs 49 guiding it along the inner walls of the valve body during its vertical movement. This valve is located directly below openings 51 in the valve body which direct the inflowing liquid downwardly against the valve 48 so as to urge that valve toward its seat. When a vacuum occurs in the supply mains and in the inlet passageway 43, the valve 48 is lifted from its seat as indicated in Fig. 2 thus permitting the entrance of air through the opening 47 into the supply mains in the inlet passageway so as to break the vacuum. The air flow capacity of the vent opening 47 is at least approximately equal to the flow capacity of pipe 55.

Instead of admitting air to the outlet passageway 44 this type of valve shuts off the outlet passageway upon the occurrence of a partial vacuum in the inlet passageway 43 so as to substantially prevent the suction of liquid from the outlet passageway back to the inlet passageway and supply mains. To this end I provide a valve for shutting off flow of liquid through the valve body when the vent valve 48 is opened as shown in Fig. 2. The form of valve here shown is of the sleeve type wherein the inner sleeve 52 is formed integral with the valve partition means which provides the opening 45. As best seen in Figs. 1 and 2 this is a vertically extending sleeve concentric with the opening 45 and surrounding it on its upper side. The outer sleeve of the valve is shown at 53 and is carried rigidly with the valve 48 in sliding contact with the sleeve 52. When the valve 48 is in its open or uppermost position as shown in Fig. 2 the upper face of sleeve 53 fits tightly against the partition 54 of the valve body thus effectually sealing off communication between the inlet passageway 43 and the outlet passageway 44, regardless of the position of the valve 46. The inlet pipe 55, outlet pipe 56 and valve actuator 57 have been given similar reference characters in the various figures so that the location of the parts may be clearly understood.

It will be noted in my device here illustrated that the air vent opening, being annularly arranged, presents a greater opening than the cross sectional area of the water inlet conduit so that if a partial vacuum occurs in the water inlet conduit, air will flow through the vent opening at comparatively low velocity to satisfy that vacuum. If, under a condition of partial vacuum, air is sucked at high velocity through a small vent opening as in the prior art, it may cause an injector effect at the outlet opening so as to suck up contaminated water from the outlet opening and transfer it to the inlet conduit.

What I claim is:

A vacuum breaking valve structure comprising a valve body having liquid inlet and outlet passageways, a liquid control valve in said body controlling flow between said passageways, there being a vent opening through a lower wall of said valve body, the air flow capacity of said vent opening being at least approximately equal to the flow capacity of said inlet passageway, said vent opening being open to atmosphere, vent valve means in said body over and adapted to close said opening, said vent valve means being mounted for free vertical movement so that gravity will normally move said vent valve means to close said opening, said vent valve means being of such a weight that it is lifted to open position by vacuum in said inlet passageway, and means independent of said liquid control valve and responsive to opening movement of said vent valve means for closing communication between said liquid inlet and outlet passageways, whereupon upon loss of pressure and creation of vacuum in said inlet passageway air is drawn through said opening into said valve body as rapidly as liquid retreats along said inlet passageway, and upon a return flow of liquid through said inlet passageway into said body there will be no leakage out of said vent opening.

DWIGHT M. ANDERSON.